(12) United States Patent
Segato

(10) Patent No.: US 8,128,164 B2
(45) Date of Patent: Mar. 6, 2012

(54) HUMAN BODY SUPPORTING STRUCTURE, PARTICULARLY BICYCLE SADDLE AND METHOD OF MAKING SAME

(75) Inventor: Stefano Segato, Vicenza (IT)

(73) Assignee: Selle Royal S.p.A., Pozzoleone (Vicenza) (IT)

( * ) Notice: Subject to any disclaimer, the term of this patent is extended or adjusted under 35 U.S.C. 154(b) by 347 days.

(21) Appl. No.: 12/595,780

(22) PCT Filed: Apr. 14, 2008

(86) PCT No.: PCT/IB2008/051416
§ 371 (c)(1),
(2), (4) Date: Oct. 13, 2009

(87) PCT Pub. No.: WO2008/126052
PCT Pub. Date: Oct. 23, 2008

(65) Prior Publication Data
US 2010/0045084 A1    Feb. 25, 2010

(30) Foreign Application Priority Data
Apr. 13, 2007   (IT) .............................. VI2007A0111

(51) Int. Cl.
*B62J 1/00* (2006.01)
(52) U.S. Cl. ............... 297/215.16; 297/202; 297/452.15
(58) Field of Classification Search ............... 297/195.1, 297/202, 215.16, 452.15
See application file for complete search history.

(56) References Cited

U.S. PATENT DOCUMENTS

| 3,997,214 | A  | * | 12/1976 | Jacobs ......................... 297/214 |
| 4,098,537 | A  | * | 7/1978 | Jacobs ..................... 297/215.16 |
| 4,218,090 | A  | * | 8/1980 | Hoffacker et al. ............ 297/214 |
| 6,030,035 | A  | * | 2/2000 | Yates ........................... 297/214 |
| 6,976,736 | B2 | * | 12/2005 | Yu ............................. 297/215.16 |
| 7,096,605 | B1 |   | 8/2006 | Kozo et al. |
| 2002/0112379 | A1 |   | 8/2002 | Sussmann et al. |
| 2003/0164629 | A1 | * | 9/2003 | Bigolin ...................... 297/195.1 |
| 2005/0121951 | A1 |   | 6/2005 | Yu |

FOREIGN PATENT DOCUMENTS

WO    WO2006092678 A2    9/2006

* cited by examiner

*Primary Examiner* — Peter R. Brown
(74) *Attorney, Agent, or Firm* — Tutujian & Bitetto, P.C.

(57) ABSTRACT

A human body supporting structure, particularly a bicycle saddle, includes a load-bearing shell having a topside designed to face towards a user and an underside designed to face a bicycle frame. The shell includes at least one continuous sheet element having at least one differently deformable portion located at particularly stressed regions of the user's body. The sheet element is formed of a thermoplastic resin matrix with reinforcement fibers embedded therein. The differently deformable portions have a smaller thickness (Si) and a locally greater average density (pi) than the rest of the extension of the shell, said portions are formed in a thermoforming step wherein a local thickness reduction is carried out by compression and by heating said sheet element to a temperature near the melting temperature of the thermoplastic matrix. A method of making such support structure is further provided.

16 Claims, 4 Drawing Sheets

HUMAN BODY SUPPORTING STRUCTURE, PARTICULARLY BICYCLE SADDLE AND METHOD OF MAKING SAME

BACKGROUND

1. Technical Field

The present invention finds application in the art of sport and leisure and particularly relates to a human body supporting structure and a method of making same.

Particularly, a human body supporting structure may be a bicycle saddle, a seating surface of a chair, a human body protection device, a shoe insole, a helmet, a glove and the like.

2. Description of Related Art

Human body supports, particularly bicycle saddles, are known to include a shell for supporting a user's weight. Certain types of supports are further known to include a load-bearing shell having one or more differently deformable portions, i.e. having a higher resilience as compared with the rest of the shell.

These higher resilience portions, usually located in the areas of contact between the shell and certain sensitive areas of the user, may be formed using a variety of methods.

EP1305203, in the name of the same applicant, discloses a bicycle saddle structure having all the features of the preamble of claim 1. The saddle specifically comprises a load-bearing shell formed from multiple thermoformed sheet elements of composite material which are designed to create differently deformable portions. These portions are formed by interleaving a continuous thermoplastic base sheet element between or among two or more sheet elements of thermosetting composite material, in which apertures have been formed, while taking care that the various layers are laid one above the other to match the apertures.

This prior art method has a few apparent drawbacks.

First, the method is of very difficult implementation, because the apertures of the various sheet elements have to match almost perfectly.

Furthermore, an adequate mechanical strength can be only obtained by laying a considerable number of sheet elements one above the other, wherefore the final product is excessively heavy and poorly cost effective.

SUMMARY OF THE INVENTION

The object of the present invention is to overcome the above drawbacks, by providing a support structure that is highly efficient and relatively cost-effective.

A particular object is to provide a support structure that also has a low weight and a sturdy construction.

Another object is to provide a method of making a support structure whereby light and sturdy products can be manufactured in a simple and repeatable manner.

These and other objects, as better explained hereinbelow, are fulfilled by a human body supporting structure as claimed in claim 1, which comprises a load-bearing shell having a topside designed to face towards a user and an underside designed to face a bicycle frame. The shell comprises at least one continuous sheet element of predetermined extension having at least one differently deformable portion located at intensively stressed regions of the user's body. The shell is further formed of a thermoplastic resin matrix wherein reinforcement fibers are embedded. The differently deformable portions have a smaller thickness and a locally greater average density than the rest of the extension of the shell.

By providing the differently deformable portion of the sheet element of the shell with a locally smaller thickness and a locally greater density as compared with the rest of its extension, improved mechanical strength and resilience may be imparted to the sheet element at the differently deformable portion.

Thus a shell with differently deformable portions can be provided, which shell is much lighter than prior art shells of the same type, having the same mechanical strength.

According to another aspect of the invention, a method is provided for making the above mentioned support structure in accordance with claim 9, which method includes the following steps of; providing at least one continuous sheet element formed of a thermoplastic matrix having a predetermined average density in which reinforcement fibers are embedded; forming the sheet element in such a manner as to define at least one differently deformable portion located at intensively stresses regions of the user's body.

The forming step comprises thermoforming and local reduction of the thickness of the at least one sheet element at the differently deformable portions to locally increase the average density of said at least one differently deformable portion, thereby imparting a higher resilience to the continuous sheet element at such portions.

Advantageous embodiments of the invention are defined in accordance with the independent claims.

BRIEF DESCRIPTION OF THE DRAWINGS

Further features and advantages of the invention will be more apparent from the detailed description of a preferred, non-exclusive embodiment of a bicycle saddle structure and method of making same according to the invention, which is described by way of a non-limiting example with reference to the annexed drawings, in which.

DETAILED DESCRIPTION OF PREFERRED EMBODIMENTS

Figure 1:
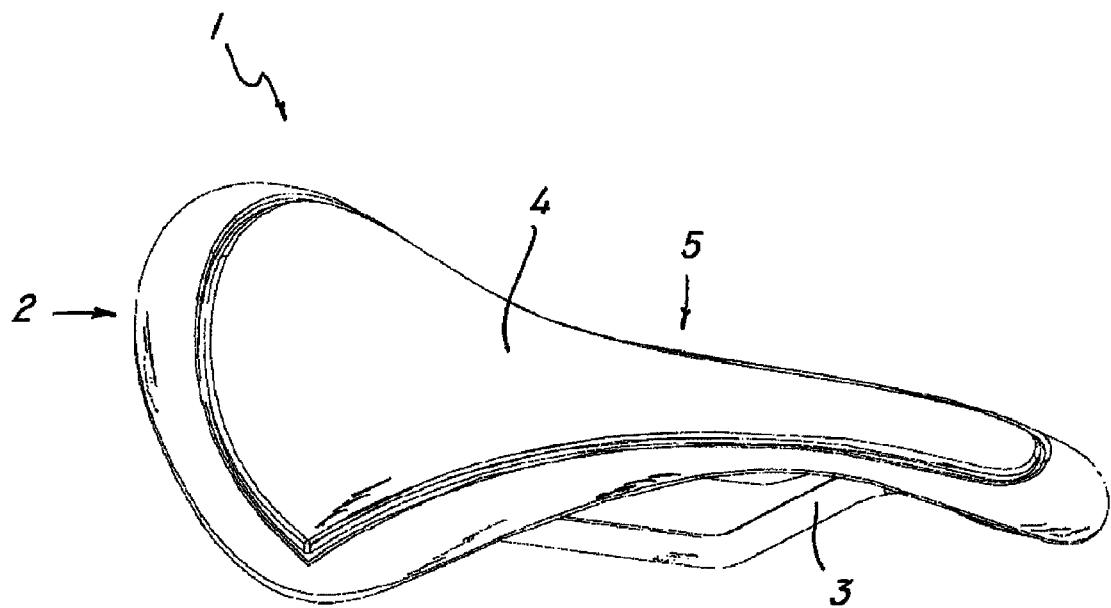
FIG. 1 is an axonometric view of a first embodiment of the saddle structure of the invention.

Referring to the above figures, the human body supporting structure of the invention will be described by way of a non limiting example as a bicycle saddle, and the method will be particularly designed for making same. Nevertheless, it is understood that the human body supporting structure of the invention may be embodied in other forms, such as a seating surface of a chair, a human body protection device, a shoe insole, a helmet, a glove and the like, without departure from the scope of the invention, as defined by the contents of the annexed claims.

The bicycle saddle, generally designated by numeral 1, may substantially include a support body 2 for supporting a seated user and rails 3 for attachment of the saddle structure 1 to a movable or stationary frame, such as a bicycle frame, not shown as being well known per se.

The support body 2 comprises a load-bearing shell 4 having a topside 5 designed to face towards the user and an underside 6 with the rails 3 fixed thereto for attachment to the bicycle frame.

In the non limiting examples shown hereinafter, two embodiments of the shell 4 are described and depicted in FIGS. 2-3 and 4-5 respectively. In all cases, the shell 4 comprises at least one continuous sheet element 7 of predetermined surface extension made from a thermoplastic composite material composed of a thermoplastic resin matrix wherein reinforcement fibers, such as carbon, glass, Kevlar®, titanium, steel, nitinol®, dynema® HEPP (High Engineered PolyPropylene) sold by Milliken® fibers, natural fibers (jute, linen, wool, etc.) or the like are embedded.

As used herein, the term "continuous sheet element" is intended to mean an element having a substantially planar extension, i.e. having two dimensions prevailing over the other and substantially continuous, i.e. with no apertures or the like.

The sheet element 7 has at least one differently deformable portion 8 throughout its extension, located at intensively stressed regions of the user's body, such as in the ischial and/or prostatic and/or peripheral areas of the shell.

As used herein, the term "ischial area" or the like is intended to designate the area of the shell that is designed to support the region corresponding to the ischial bones of the user, and the term "prostatic area" or the like is intended to designate the area of the shell that is designed to support the region corresponding to the prostate of the user.

Also, as used herein, the term "differently deformable portion" or the like is meant to designate an area within the surface of the load bearing shell 4 that, under a load, has a remarkably different deformability than that provided by at least another area having the same surface when subjected to the same load.

One peculiar feature of the invention is that the differently deformable portion 8 has a locally smaller thickness $S_1$ and a locally greater average density $\rho_1$ than the rest of the surface extension of the load bearing shell 4.

By this arrangement a higher resilience may be imparted to the sheet element 7 at the differently deformed portion 8, as compared with the other areas of the shell 4.

Figure 3:
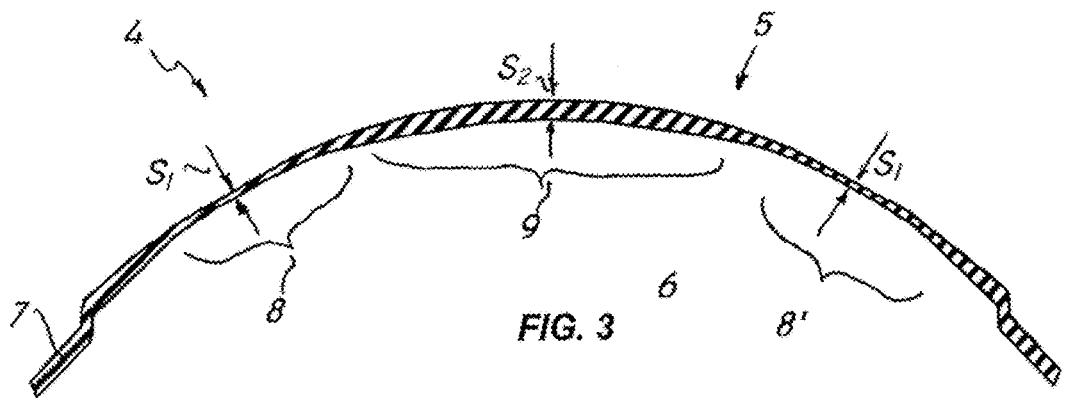
FIG. 3 is a sectional view of the embodiment of FIG. 1, as taken along a plane III-III.
Figure 5:
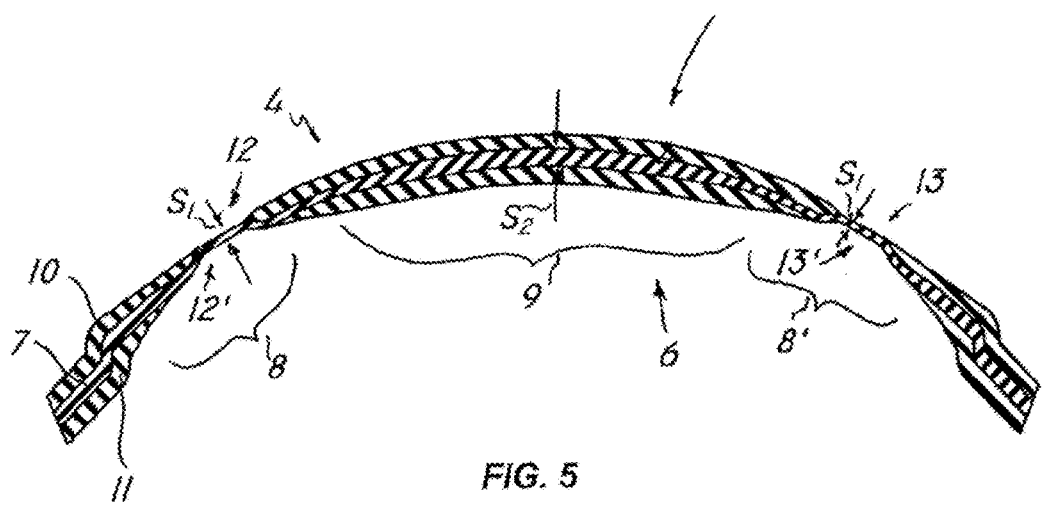
FIG. 5 is a sectional view of the embodiment of FIG. 4, as taken along a plane V-V.

This is apparent in FIGS. 3 and 5, which show two different embodiments of the invention. These embodiments include a plurality of differently deformed areas. Unless otherwise stated, reference will be made to one of the differently deformable portions 8 only, its characteristics being intended to be also provided in the other differently deformable portions.

FIG. 3 shows a first embodiment of the invention, in which the shell 4 is made up of one sheet element 7 only. Nevertheless, it shall be understood that the shell 4 may also consist of multiple sheet elements of the same type, without departure from the inventive scope as defined in the annexed claims. This embodiment includes three differently deformable portions, with the first two portions, designated by numerals 8, 8' being formed at the ischial area and the other, designated by numeral 8", being formed at the prostatic area.

In this embodiment, the thickness $S_1$ of the differently deformable area 8 is smaller than the thickness 52 of the other areas of the sheet element 7, e.g. the central area 9. Also, the average density $\rho_1$ of the differently deformable portion 8 is greater than the average density $\rho_2$ of the central area 9. The combination of these two characteristics will impart a higher deformability to the differently deformable portion 8 as compared to that of the central portion 9, which will be thus less resilient and deformable.

FIG. 5 shows a second embodiment of the invention, in which the shell 4 is formed of a continuous sheet element 7 interposed between two discontinuous sheet elements 10, 11 having apertures 12, 12' and 13, 13' coincident with the differently deformable portions 8, 8'.

In this embodiment, the thickness $S_1$ of the differently deformable area 8 is smaller than the thickness $S_2$ of the other areas of the sheet element 7, e.g. the central area 9. Also, the average density $\rho_1$ of the differently deformable portion 8 is greater than the average density $\rho_2$ of the central area 9.

Advantageously, the discontinuous sheet elements 10, 11 may be formed of the same material as the continuous sheet element 7 and may have a different color from the latter, to create a pleasant color effect.

The ratio between the average thickness $S_1$ of the continuous sheet element 7 at the differently deformable portion 8 and the average thickness $S_2$ of the rest of the extension thereof may fall in a range from 0.1 to 0.9 and is preferably about 0.7. Experimental tests showed that these values ensure the best ratio between the mechanical properties and the weight of the shell 4.

Suitably, the thickness change of the sheet element 7 at the differently deformable portion 8 may occur in a gradual and substantially continuous manner. This will ensure the best distribution of load stresses over that area.

Conveniently, the shell 4 may be obtained by thermoforming the sheet element 7, whereas the differently deformable portions may be formed by locally reducing the thickness of such sheet element 7 at the differently deformable portions during thermoforming.

This method includes the steps of providing the continuous sheet element 7 which has a substantially constant thickness $S_3$ upstream from the thermoforming process, and of subsequently thermoforming it. During the thermoforming process, the thickness of the continuous sheet element is reduced at the differently deformable portion 8, which changes from the initial thickness $S_3$ to the thickness $S_1$.

As used herein, the term "providing" and derivatives thereof, designates the preparation of a relevant element for a relevant process step, including any preventive treatment designed for optimal performance of such relevant step, from simple collection and possible storage to thermal and/or chemical and/or physical and the like pre-treatments.

Suitably, the thermoforming and local thickness reduction step on the continuous sheet element 7 may be carried out by heating the latter to a temperature near the melting temperature of the thermoplastic matrix, thereby reducing its viscosity.

Thus, as the continuous sheet element 7 is compressed, its thickness will be locally reduced, changing from thickness $S_3$ to $S_1$, wherefore the resin thereat, which has highly viscous properties upstream from thermoforming, will migrate to other areas.

Figure 2:
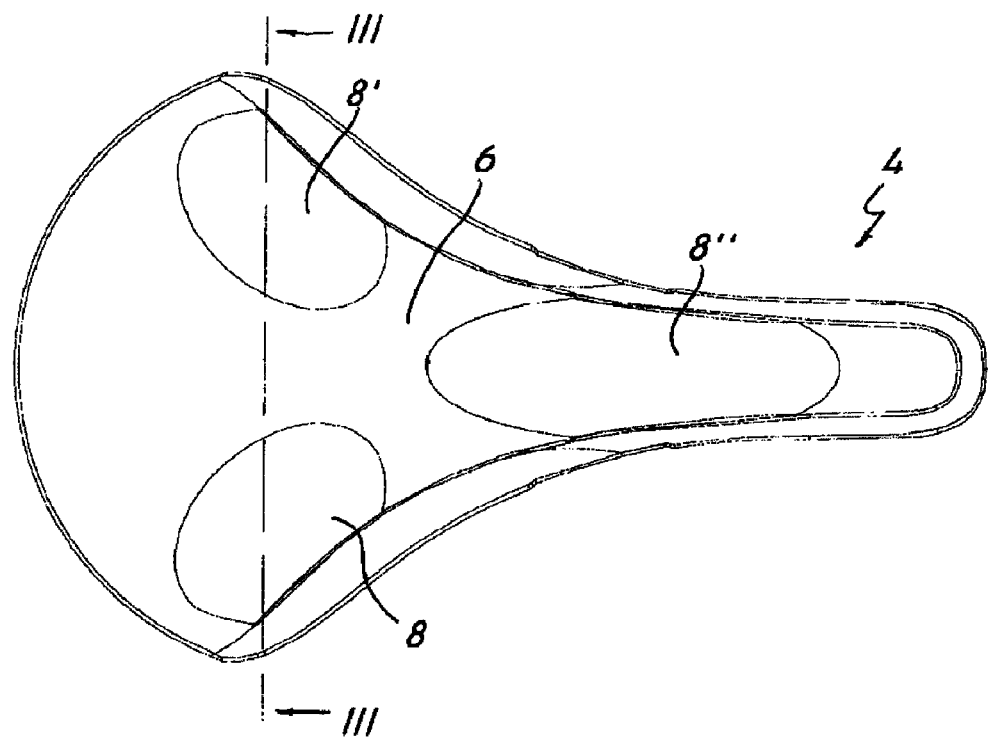
FIG. 2 is a bottom view of the embodiment of FIG. 1.
Figure 4:
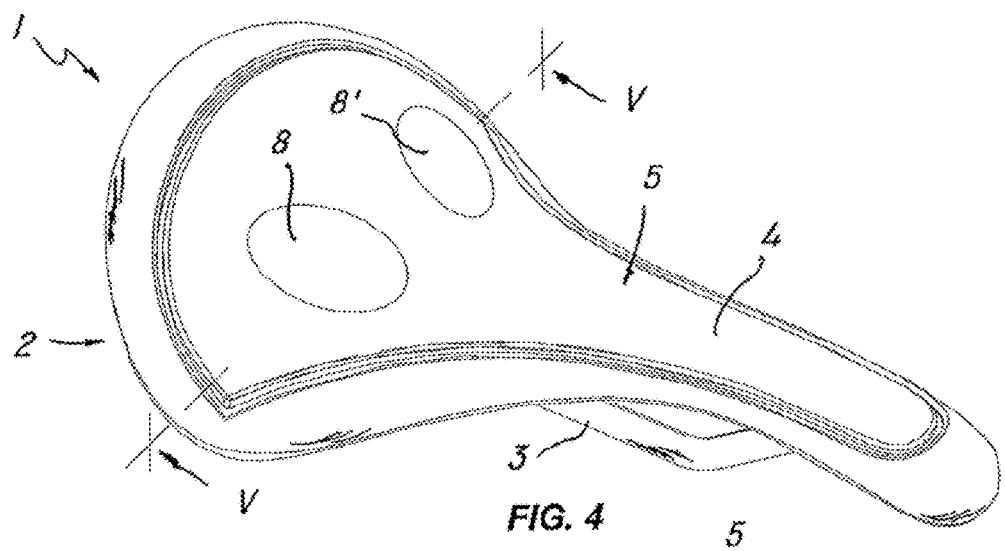
FIG. 4 is an axonometric view of a second embodiment of the saddle structure of the invention.

In a preferred, non exclusive embodiment, the method of the invention is implemented through the steps as shown in FIGS. 6 to 9, While this method has been only described with reference to the first embodiment of the saddle structure of the invention, as shown in FIGS. 2-3, it shall be understood that it is also applicable to the other embodiment of the support structure of the invention, as shown in FIGS. 4-5.

Figure 6:
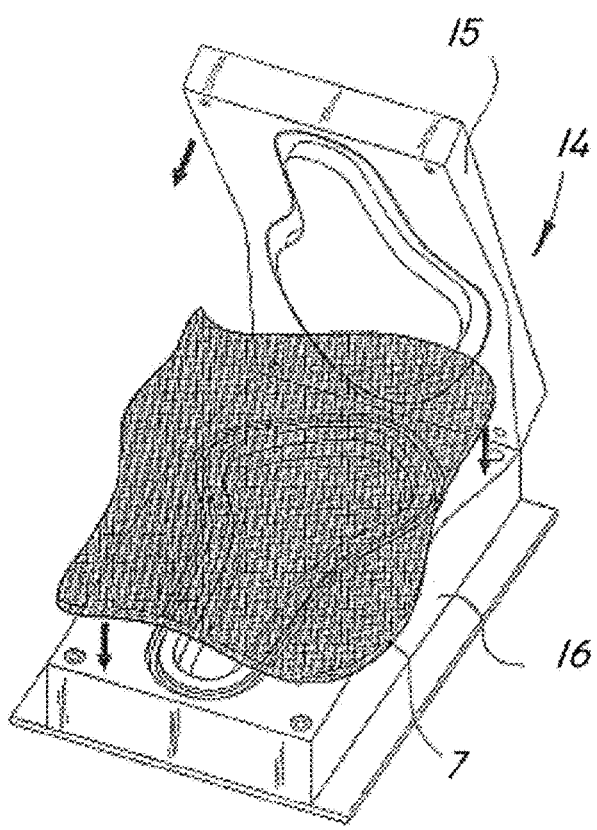
FIG. 6 is an axonometric view of a first operating step of the method of the invention.
Figure 7:
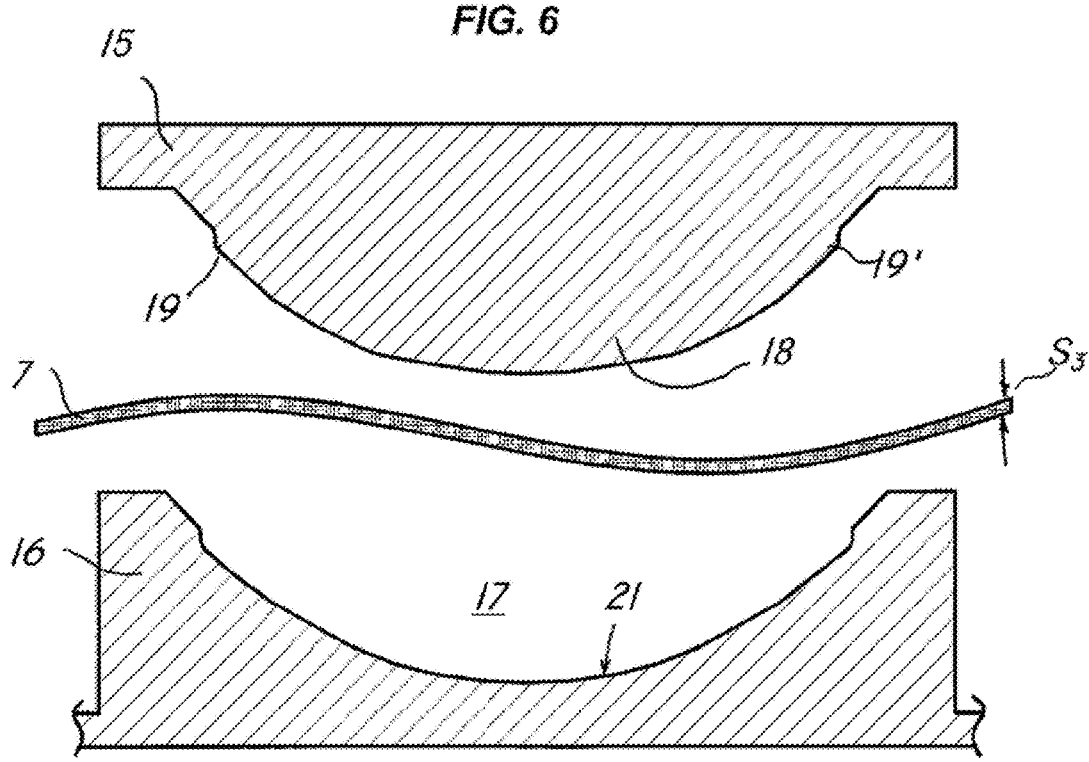
FIGS. 7, 8 and 9 are sectional views of certain operating steps of the method of the invention.

FIGS. 6 and 7 show the step of introducing the continuous sheet element 7, of fabric or unwoven fabric type, preimpregnated with the thermoplastic resin and having an initial thickness S3, in a suitable mold 14 composed of male and female members 15, 16. The female member 16 has a cavity 17 whose shape is substantially complementary to the topside of the thermoformed shell 4, whereas the male member 15 has a pressing portion 18 adapted to cooperate therewith to compress the continuous sheet element 7 to cause reduction of its thickness. The male member 15 has a pair of surface projections 19, 19' that are designed to compress the continuous sheet element 7 coincident with the differently deformable portions 8, 8'.

Figure 8:
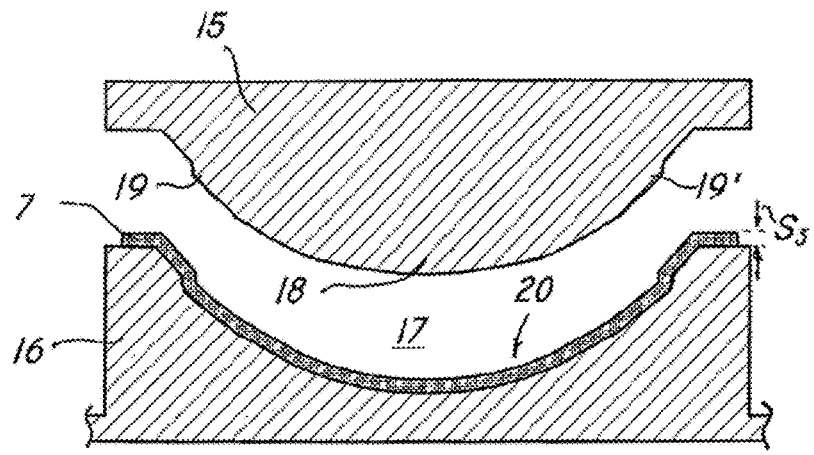
Figure 9:
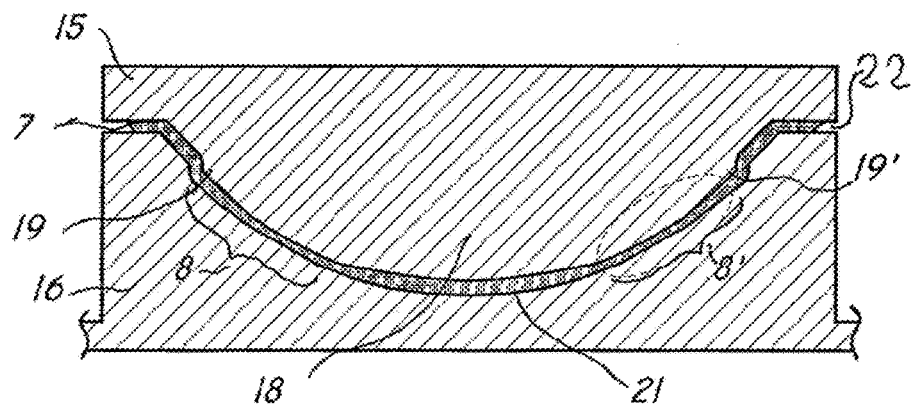
Figure 10:
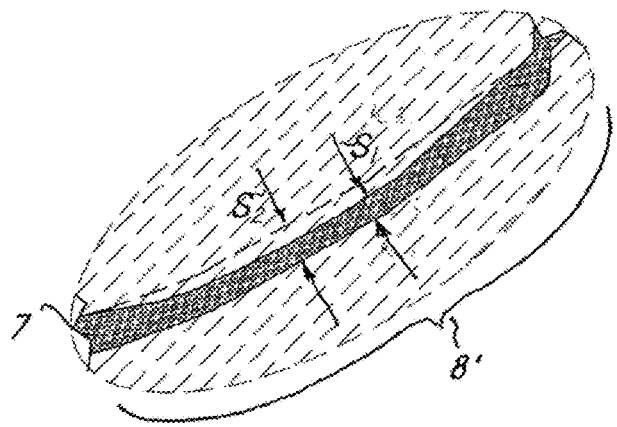
FIG. 10 is an enlarged view of certain details of FIG. 9.

The next step, as shown in FIG. 8, provides closing of the mold 14 by coupling the male member 15 with the female member 16. Thus, the sheet element 7 is compressed therebetween.

Later, the mold is heated to the incipient melting temperature of the thermoplastic resin, which melts and thence loses some of its viscosity. The pressing portion 18 of the male member 15 will compress the sheet element 7 at its topside 20, whereas the upper surface 21 of the cavity 17 of the female member 16 will act as an abutment there for. The surface projections 19, 19' will compress the sheet element 7 at the differently deformable portions 8, 8', to cause a local thickness reduction from $S_2$ to $S_1$ and resin migration to the surrounding areas, as described above.

It will be understood that, for the thermoformed sheet element to have the thicknesses $S_2$ and $S_1$, as shown in FIGS. 3 and 5, the gap 22 between the male member 15 and the female member 16 of the mold 14 must have substantially corresponding dimensions. Similarly, to obtain the above mentioned compression ratio, the ratio between the thickness of the gap 22 at the thickness reduction area and the rest of the sheet element 7 shall fall in a range from 0.1 to 0.9 and is about 0.7.

Now, the mold 14 is cooled while keeping the male and female members 15 and 16 in position until the resin hardens, so that resin cannot flow into the areas 8, 8' that will maintain the thermoforming thickness $S_1$, while the other areas will maintain the thickness $S_2$.

In order that the areas 8, 8' may be formed as shown in FIG. 3, i.e. be defined by a recess at the lower surface of the sheet element 7, the upper surface 21 of the cavity 17 of the female member 16 opposite to the projections 19, 19' is free of any projection and/or recess.

The above disclosure clearly shows that the support structure and method of the invention fulfill the intended objects.

The support structure and method of the invention are susceptible to a number of changes or variants, within the inventive concept disclosed in the appended claims. All the details thereof may be replaced by other technically equivalent parts, and the materials may vary depending on different needs, without departure from the scope of the invention.

While the support structure and method have been described with particular reference to the accompanying figures, the numerals referred to in the disclosure and claims are only used for the sake of a better intelligibility of the invention and shall not be intended to limit the claimed scope in any manner.

The invention claimed is:

1. A supporting structure, for a bicycle saddle and/or a seating surface of a chair, particularly for supporting parts of the human body, which comprises a load-bearing shell having a topside designed to face towards a user and an underside susceptible of being attached to a movable or stationary frame, wherein said shell comprises at least one continuous sheet element of predetermined extension, said at least one continuous sheet element having at least one differently deformable portion located at intensively stressed regions of the user's body and being formed of a resin matrix with reinforcement fibers embedded therein, wherein said resin matrix is of thermoplastic type, said at least one differently deformable portion having a smaller thickness (S1) and a locally greater average density (P1) as compared with the rest of its extension, thereby imparting to said continuous sheet element a higher mechanical strength and resilience at said at least one differently deformable portion.

2. The structure as claimed in claim 1, wherein said shell is obtainable by thermoforming of said sheet element, said at least one differently deformable portion being obtainable by local reduction of the thickness of said sheet element at said areas during thermoforming.

3. The structure as claimed in claim 1, wherein the ratio between the average thickness of the shell in correspondence of said at least one differently deformed thickness and the rest of said extension falls in a range from 0.1 to 0.9 and is preferably about 0.7.

4. The structure as claimed in claim 1, wherein the thickness of said sheet element changes at said at least one differently deformable portion in a gradually and substantially continuous manner.

5. The structure as claimed in claim 1, wherein said shell has a plurality of differently deformable portion located at the ischial and/or prostatic and/or peripheral areas of the shell.

6. The structure as claimed in claim 1, wherein said shell comprises at least one discontinuous sheet element superposed to said at least one continuous sheet element, said at least one discontinuous sheet element having at least one aperture at said at least one differently deformable portion.

7. The structure as claimed in claim 6, wherein said at least one discontinuous sheet element is made of the same material as said continuous sheet element.

8. The structure as claimed in claim 6, wherein said at least one discontinuous sheet element has a different color from said continuous sheet element.

9. A method for making a supporting structure for a bicycle saddle and/or a seating surface of a chair, as claimed in claim 1, comprising the following steps:
providing at least one load-bearing shell having a topside designed to face towards a user and an underside susceptible of being attached to a movable or stationary frame, wherein said shell comprises at least one continuous sheet element formed of a thermoplastic matrix having a predetermined average density, and reinforcement fibers embedded therein;
forming said sheet element to define at least one differently deformable portion in contact with the user and in correspondence of intensively stressed regions of the user's body;
wherein said forming step comprises thermoforming and local reduction of the thickness of said at least one sheet element at said differently deformable portions to locally increase the average density ($\rho_1$) of said at least one differently deformable portion, thereby imparting a higher resilience to said continuous sheet element at such portions.

10. The method as claimed in claim 9, wherein said step of local reduction of the thickness of said sheet element is carried out by compression.

11. The method as claimed in claim 9, wherein said thermoforming and local thickness reduction step is carried out by heating said sheet element to a temperature near the melting temperature of the thermoplastic matrix.

12. The method as claimed in claim 9, wherein said thermoforming step is carried out by introducing said sheet element in a mold which comprises a female member having a cavity with a shape substantially complementary to the topside of said thermoformed shell and a male member with a pressing portion adapted to cooperate with said cavity.

13. The method as claimed in claim 12, wherein said male member has at least one surface projection which is designed to compress said sheet element, thereby reducing its thickness at said at least one differently deformable portion.

14. The method as claimed in claim 13, wherein the surface of said female member opposite to said at least one projection of said male element is free of any projection and/or recess.

15. The method as claimed in claim 13, wherein the ratio between the thickness of the gap between said male member and said female member of said mold at said thickness reduction and the rest of the sheet element falls in a range between 0.1 to 0.9 and is about 0.7.

16. The method as claimed in claim 9, wherein said sheet element is of the thermoplastic resin preimpregnated type.

* * * * *